US006974268B2

(12) United States Patent
Inoue

(10) Patent No.: US 6,974,268 B2
(45) Date of Patent: Dec. 13, 2005

(54) PRINT SYSTEM, PRINT CONTROL APPARATUS, PRINTING METHOD, AND CONTROL PROGRAM FOR PROCESSING PRINT DATA

(75) Inventor: Takashi Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/102,648

(22) Filed: Mar. 22, 2002

(65) Prior Publication Data

US 2002/0146262 A1 Oct. 10, 2002

(30) Foreign Application Priority Data

Mar. 27, 2001 (JP) ............................ 2001-090935
Mar. 15, 2002 (JP) ............................ 2002-072166

(51) Int. Cl.[7] .......................... B41J 11/44; G06K 15/00
(52) U.S. Cl. ......................................... 400/76; 358/1.1
(58) Field of Search .................. 400/76, 719; 358/1.1, 358/1.9, 1.15, 2.1; 101/483, 494

(56) References Cited

U.S. PATENT DOCUMENTS 5,034,806 A * 7/1991 Ikeda et al. ................. 358/540
5,513,254 A * 4/1996 Markowitz ............. 379/100.17
5,867,170 A * 2/1999 Peterson ..................... 345/592
5,897,260 A * 4/1999 Zingher ...................... 400/719
6,014,629 A * 1/2000 DeBruin-Ashton ............ 705/2
6,167,382 A * 12/2000 Sparks et al. ................. 705/26
6,173,274 B1 * 1/2001 Ryan, Jr. .................... 705/408
6,216,112 B1 * 4/2001 Fuller et al. .................. 705/14
6,311,185 B1 * 10/2001 Markowitz et al. ........... 707/10
6,334,109 B1 * 12/2001 Kanevsky et al. ............ 705/14
6,406,062 B1 * 6/2002 Brooks et al. ................ 283/92
6,483,570 B1 * 11/2002 Slater et al. .................. 355/40
6,611,348 B1 * 8/2003 Chase et al. ............... 358/1.15
6,705,781 B2 * 3/2004 Iwazaki ....................... 400/62
2001/0013012 A1 * 8/2001 Hanaoka et al. .............. 705/14
2001/0029465 A1 * 10/2001 Strisower ..................... 705/14
2001/0037320 A1 * 11/2001 Allport et al. .............. 705/405
2002/0038612 A1 * 4/2002 Iwazaki ...................... 101/484
2002/0057451 A1 * 5/2002 Ishijima ..................... 358/1.15
2002/0063897 A1 * 5/2002 Matsumoto ................ 358/1.18
2002/0085230 A1 * 7/2002 Kitahara et al. ........... 358/1.16
2002/0097436 A1 * 7/2002 Yokoyama et al. .......... 358/2.1
2002/0194261 A1 * 12/2002 Teshima ..................... 709/203
2004/0122811 A1 * 6/2004 Page ............................ 707/3

* cited by examiner

*Primary Examiner*—Andrew H. Hirshfeld
*Assistant Examiner*—Wasseem H. Hamdan
(74) *Attorney, Agent, or Firm*—Fitzpatrick, Cella, Harper & Scinto

(57) ABSTRACT

It is an object to allow an advertising effect to be efficiently exercised by certainly printing an advertisement. For this purpose, according to the invention, print data of the user and advertisement data are synthesized so that an image based on the print data of the user is printed into a user print area on a recording medium and an image based on the advertisement data is printed into an advertisement print area on the recording medium, thereby forming image data. On the basis of the formed image data, the image based on the print data of the user is formed into the user print area on the recording medium and the image based on the advertisement data is formed into the advertisement print area on the recording medium.

19 Claims, 16 Drawing Sheets

CONVENTIONAL PRINTED MATTER

PRINTED MATTER OF THE INVENTION

EXPLANATION OF PRINT AREA MATCHING FUNCTION

FIG. 7

| KIND | COORDINATES DATA OF USER PRINT AREA | COORDINATES DATA OF ADVERTISEMENT PRINT AREA |
|---|---|---|
| PATTERN A | (0, 30, 100, 200) | (0, 0, 100, 30) |
| PATTERN B | (0, 0, 100, 170) | (0, 170, 100, 200) |
| PATTERN C | (30, 0, 100, 200) | (0, 0, 30, 200) |
| PATTERN D | (0, 0, 70, 200) | (70, 0, 100, 200) |

FIG. 13A

ADVERTISEMENT

| | ADVERTISEMENT 1 | ADVERTISEMENT 2 | ADVERTISEMENT 3 | ---- |
|---|---|---|---|---|
| THE NUMBER | 5 | 8 | 2 | ---- |

FIG. 13B

USER

| | USER A | USER B | ----------- |
|---|---|---|---|
| ADVERTISEMENT 1 | 2 | 0 | ----------- |
| ADVERTISEMENT 2 | 0 | 1 | ----------- |
| ⋮ | ⋮ | ⋮ | ⋮ |
| SUM | 18 | 6 | ----------- |

PRINT SYSTEM, PRINT CONTROL APPARATUS, PRINTING METHOD, AND CONTROL PROGRAM FOR PROCESSING PRINT DATA

BACKGROUND OF THE INVENTION

1. Field of the Invention

The invention relates to a print system or a print control apparatus for printing an image based on print data of the user and also printing an image based on advertisement data and, more particularly, to a printing method which is executed by the print system or the print control apparatus.

2. Related Background Art

Hitherto, advertisement of goods has been performed by using the Internet. According to an advertising method using the Internet, for example, when the user accesses a homepage of WWW (World Wide Web), advertisement information is displayed in association with the homepage or, when the user uses an Email service, the advertisement information is written into Email.

By viewing the advertisement information or accessing the homepage concerning the advertisement information, the user can obtain a right to receive various services. A system such that since the advertisement is displayed on the homepage, an advertiser pays advertisement rates to an administrator who manages the homepage displaying the advertisement has been established.

A hybrid electronic apparatus, a workstation, or the like including a computer, a word processor, an electronic gaming machine, and the like which is used for viewing those homepages uses an image forming apparatus such as a printer as an output apparatus.

The image forming apparatus records data which the user wants to record onto a recording medium such as paper or the like. In recent years, high picture quality of the printer has been realized and data can be easily printed like a photograph at home if only there is electronic data.

SUMMARY OF THE INVENTION

However, according to the conventional advertising method using the Internet, by the user's viewing the homepage, advertisement information (banner advertisement, spam advertisement) is displayed as a part of the homepage or the advertisement information is written in the Email, so that the advertisement information is inherently volatile or temporary and an advertising effect is not very high.

The user can refuse the display of those advertisement information by using a simple technique. In this case, the preparation of the advertisement information becomes meaningless.

The image forming apparatus such as a printer certainly needs a recording material such as ink, toner, or the like and a recording medium such as paper or the like as consumables. Since a trend toward a high-class image is rising due to the recent vogue for a high quality print, the market is filled with expensive recording materials and expensive recording media. However, since they are expensive, there is a possibility that the user refrains from the purchase of those expensive recording materials and recording media.

The invention is made to solve the problems in the above conventional techniques and it is the first object of the invention to maximize an advertising effect by certainly printing an advertisement.

The second object of the invention is to reduce a burden on the user with respect to a cost of the use of an image forming apparatus and a cost of consumables of the image forming apparatus by certainly printing an advertisement.

Further another object of the invention is to very efficiently compensate a demerit of a small advertising effect due to volatility of an Internet advertisement and a demerit of dull consumption due to high prices of a printer and its consumables.

According to the invention, since an advertisement is printed onto a non-volatile material object, an advertiser can perform very effective advertisement and publicity. Since the manufacturer of the image forming apparatus which provides printers and consumables can expect a profit of advertisement rates from the advertiser, by appropriating it for manufacturing and circulating costs of a product, a retail unit price of the image forming apparatus can be reduced. The user can obtain a printer main body and the consumables at a low cost, the burden on the user is reduced, and a large quantity of sheets can be printed without constraint.

That is, according to the invention, it is possible to provide a novel epoch-making system which is very useful to three persons such as user, advertiser, and manufacturer of the image forming apparatus.

BRIEF DESCRIPTION OF THE DRAWINGS

FIG. 7 is a diagram showing an example of a table in which coordinates data has been stored;

FIGS. 13A and 13B are diagrams showing examples of a user counter and an advertisement counter;

DETAILED DESCRIPTION OF THE PREFERRED EMBODIMENTS

Figure 1:
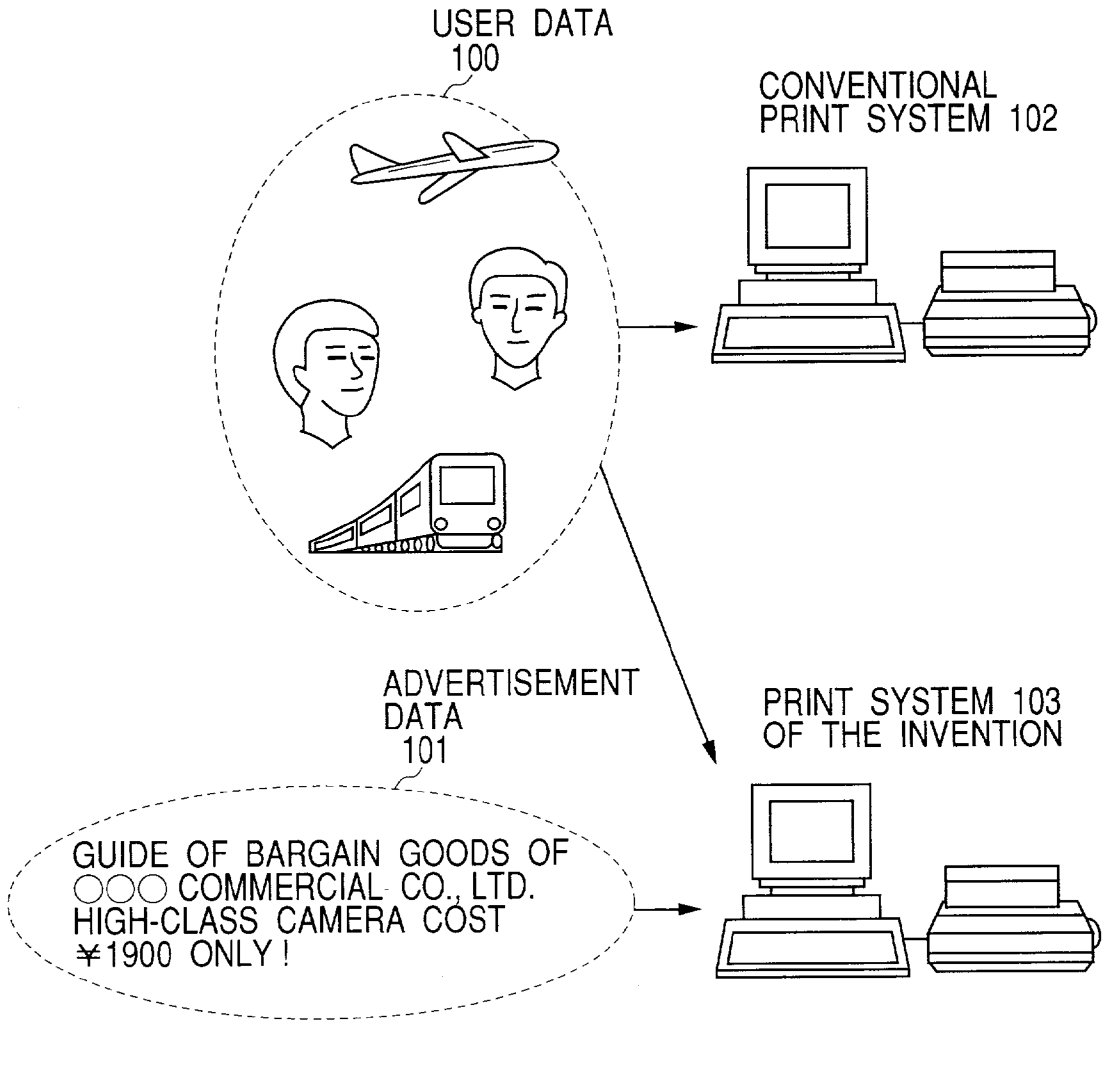
FIG. 1 is a schematic constructional diagram of a print system according to the invention.

Preferred embodiments of the invention will be explained in detail as an example hereinbelow with reference to the drawings. Dimensions of component elements, materials, shapes, their relative arrangement, and the like disclosed in the embodiment do not limit the scope of the invention unless otherwise there is a specific disclosure.

In the following drawings, component elements similar to those disclosed in the foregoing drawings are designated by the same reference numerals and will be explained hereinbelow. An explanation of each embodiment of a print system according to the invention is also applied in common to an explanation of each embodiment of a printer server, an image forming apparatus, a print advertising method, a print program, and a computer-readable recording medium in which the print program has been recorded according to the invention.

Although the print system of the invention will be described in detail hereinbelow with reference to the drawings, the invention is not limited to the following explanation so long as it uses the print system having a partial characteristic function among functions of the print system of the invention.

FIG. 1 is a schematic constructional diagram of a print system according to the invention.

Particularly, FIG. 1 is a diagram for comparing an output of the print system having a function for printing an advertisement with an output of a conventional print system.

Figure 2A:
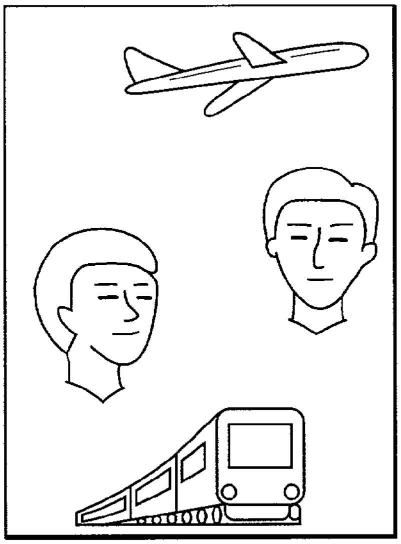
FIGS. 2A and 2B are schematic diagrams of printed matters which are formed.
Figure 2B:
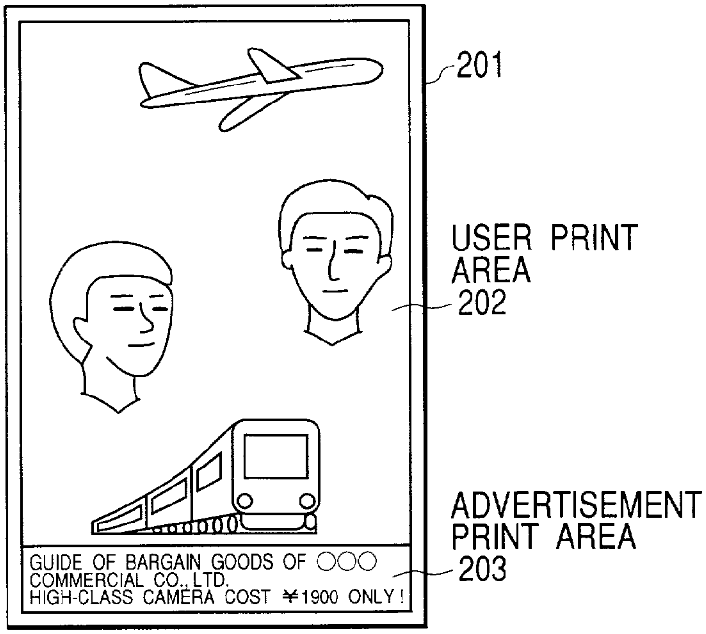

FIGS. 2A and 2B are a diagram showing matter printed by the conventional print system and matter printed by a print system having a function of printing an advertisement. In those print systems, the user forms data 100 by using an application program or the like, and the data 100 is transmitted to the print system and printed.

When the user uses a conventional print system 102, the print system 102 receives the user data 100 and outputs an image shown in FIG. 2A onto a recording medium.

A print system 103 of the invention prints an image shown by the user data 100 and prints advertisement data 101 of a specific size fetched separately from an on-line advertisement database onto the same recording medium.

In this case, the print system 103 controls a printer engine or a printer driver so that the image shown by the user data is printed into a predetermined user print area on the recording medium and an advertisement image shown by advertisement data is printed into a predetermined advertisement print area on the recording medium. In this case, the printer engine or the printer driver merges the user data and the advertisement data, and outputs an image with an advertisement.

FIG. 2B shows printed matter outputted by the print system 103. As shown in FIG. 2B, on printed matter 201, the image based on the user data 100 is formed in a user print area 202, and an image based on the advertisement data 101 is formed in a advertisement print area 203.

Figure 3:
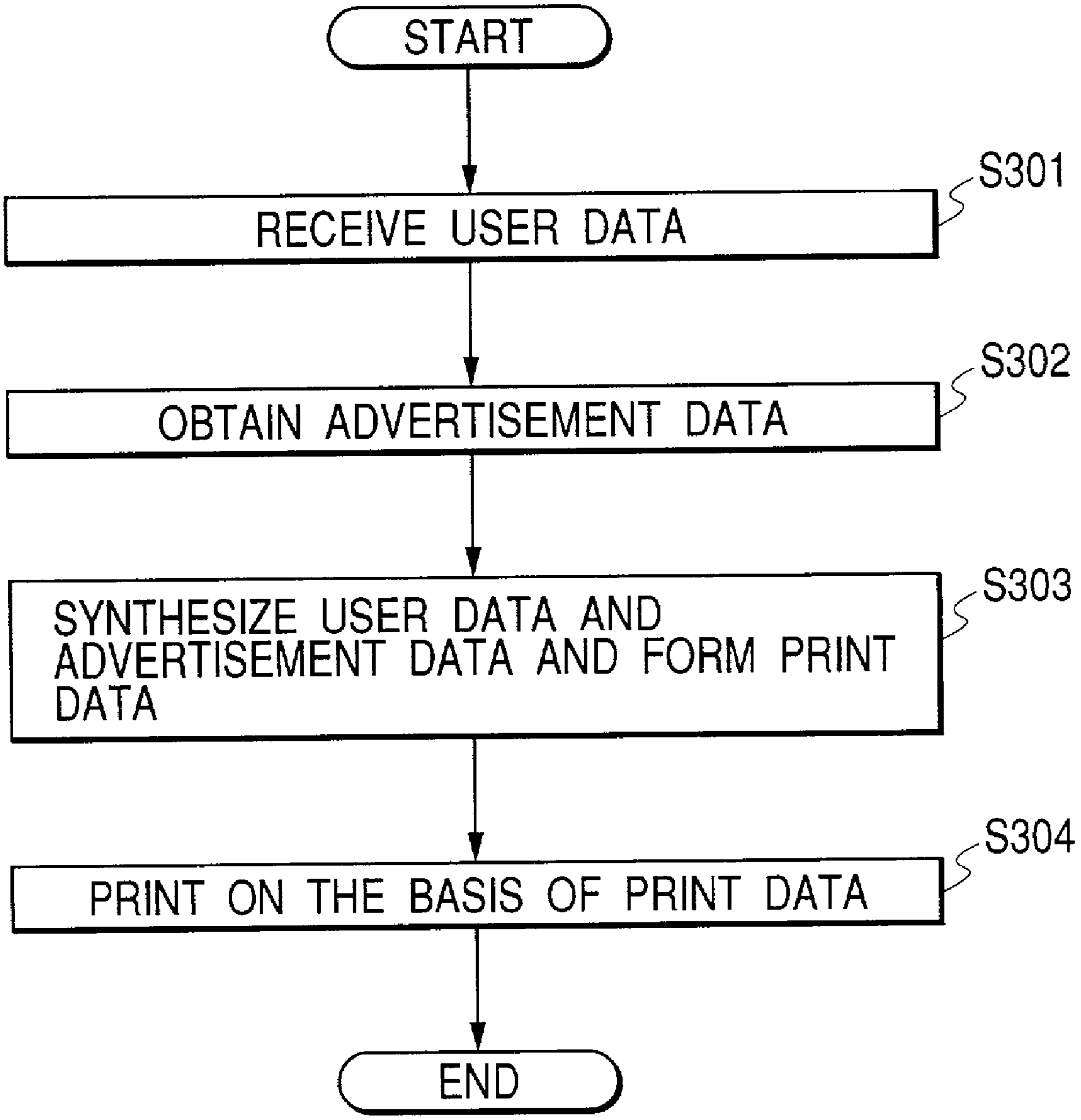
FIG. 3 is a flowchart showing a printing process which is executed in the print system.

FIG. 3 is a flowchart showing a printing process which is executed by the print system 103. A CPU of the print system 103 executes each processing step in FIG. 3 on the basis of a control program. When the print system 103 receives user data from an application program executed by a host computer (not shown) of the user or an application program executed by the print system, the print system 103 starts the process in FIG. 3. When the user inputs a print instruction by an application program, the user data 100 is transmitted to the print system 103.

First, the print system 103 receives the user data (step S301) and obtains the necessary advertisement data 101 from the advertisement database (step S302). Subsequently, the user data and the advertisement data are synthesized in a manner such that the image based on the user data is arranged in the user print area and the image based on the advertisement data is arranged in the advertisement print area, thereby forming print data (step S303). Finally, a print is performed on the basis of the formed print data (step S304).

If the print system 103 is constructed by, for example, a host computer and a printer, in step S304, the host computer transfers the print data to the printer, and the printer analyzes the print data, forms image data (for example, bit map data), and prints on the basis of the image data.

If the print system 103 is constructed by, for example, a printer, in step S304, a printer controller analyzes the print data, forms image data, transmits the image data to a printer engine, and allows the printer engine to print.

In step S303, print data can be also formed by synthesizing the image data showing the image based on the user data and the image data showing the image based on the synthetic data.

In this case, if the print system 103 is constructed by, for example, a host computer and a printer, in step S304, the host computer transfers the print data to the printer, and the printer prints on the basis of the print data.

If the print system 103 is constructed by, for example, a printer, in step S304, a printer controller transmits the print data to a printer engine and allows the printer engine to print.

Thus, when the user prints by using the print system 103, the advertisement is certainly printed. Since the image based on the user data is certainly printed in the user area, the user can form desired user data and print it.

In the examples of FIGS. 2A and 2B, the printed matter shown in FIG. 2B is larger than that of FIG. 2A by a size corresponding to the advertisement data which is printed. Therefore, special paper larger than general paper is necessary.

However, a size of recording medium which is generally circulated has been usually predetermined.

Therefore, the print system of the invention also has a print area matching (reduced-size print) function for allowing the user data to be enclosed in the user print area so that the recording medium which is generally circulated can be easily applied.

Figure 4:
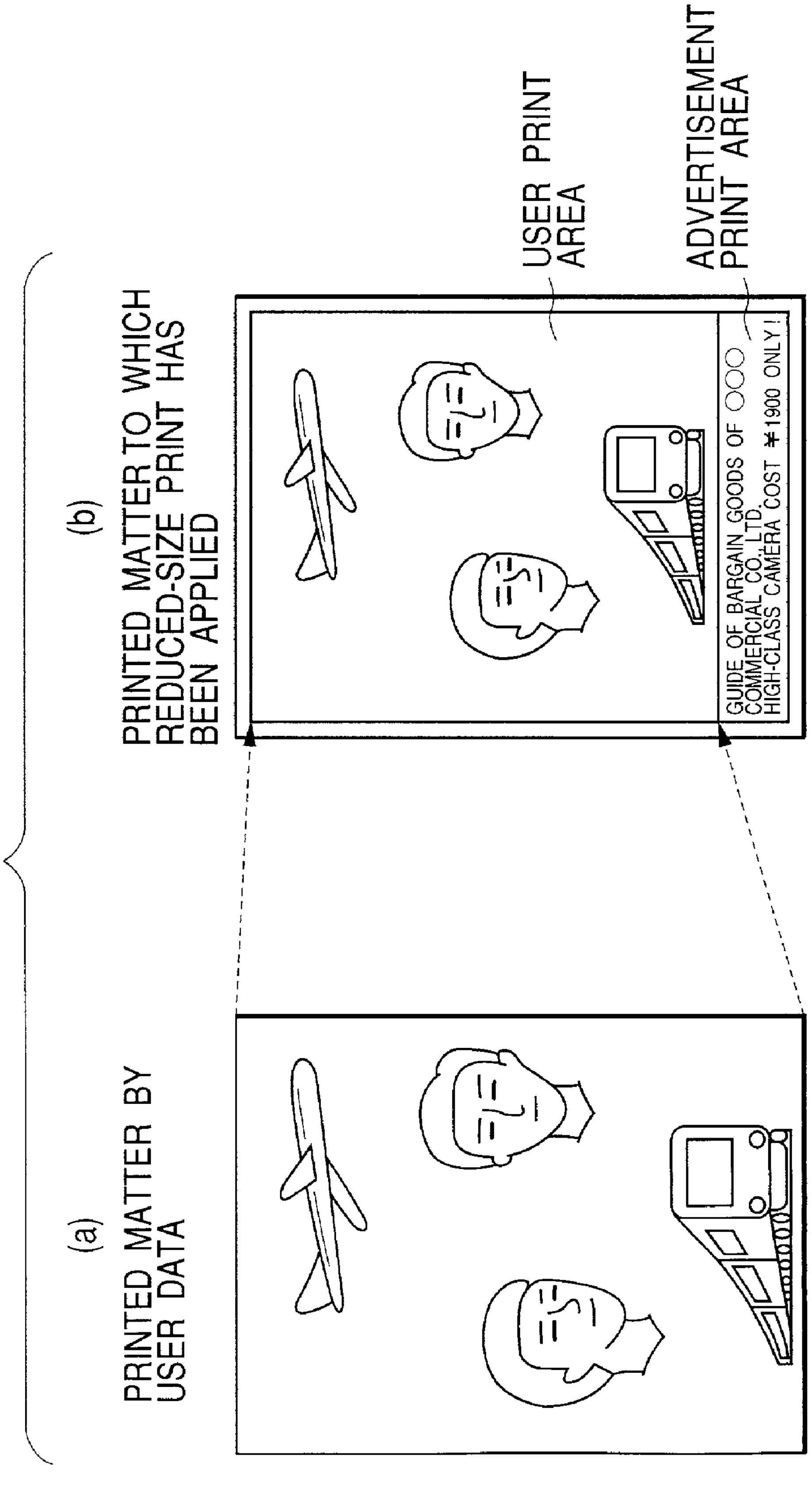
FIG. 4 is a schematic diagram of printed matters which are formed by using a print area matching function.

FIG. 4 is a schematic diagram of printed matters which are formed in case of executing the print area matching (reduced-size printing) function which is applied to the print system shown in FIG. 1. A portion (a) in FIG. 4 shows the printed matter based on the user data itself. A portion (b) in FIG. 4 shows the printed matter obtained by applying the reduced-size printing function to the user data and, further, adding advertisement data thereto.

Figure 5:
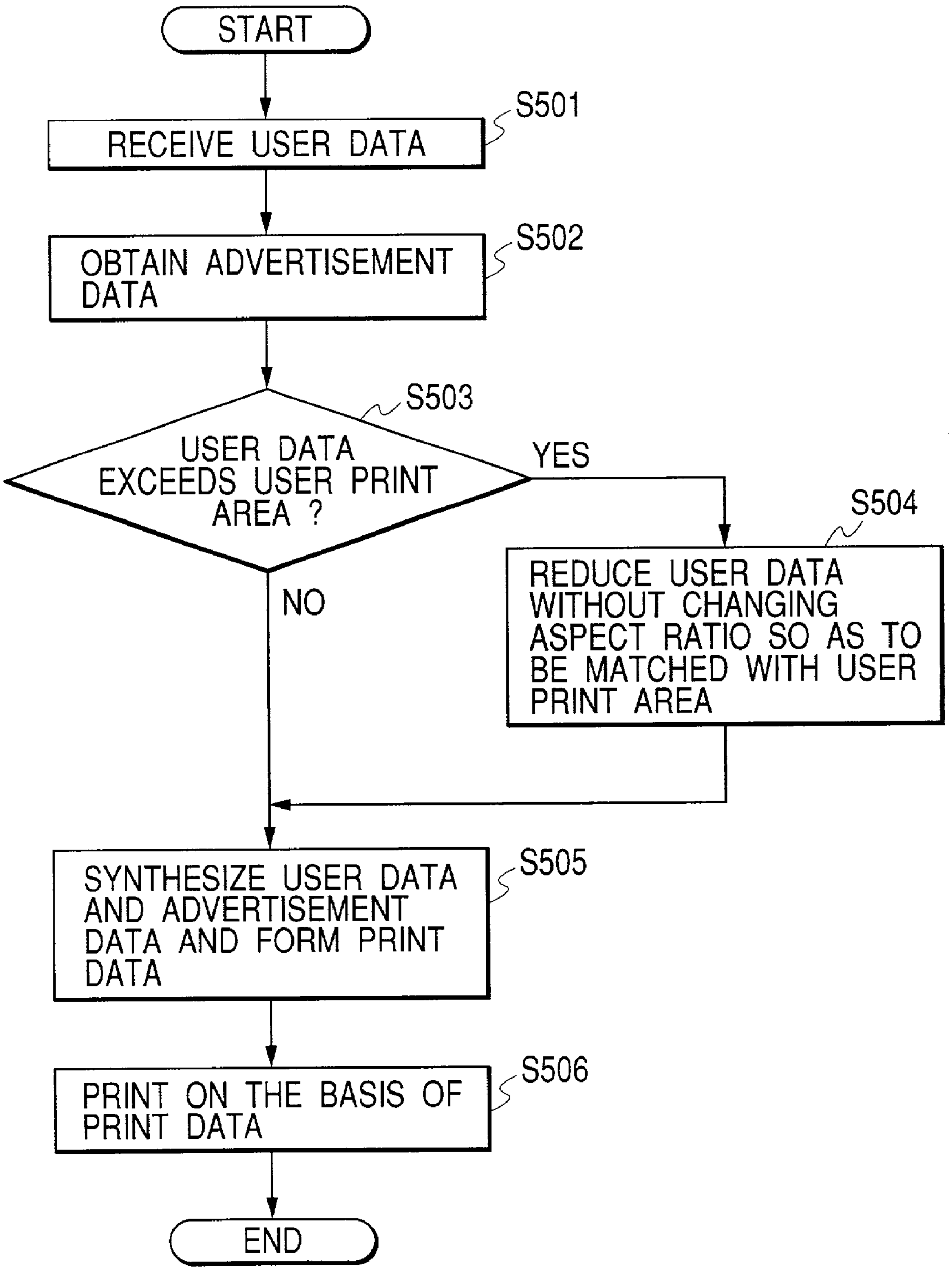
FIG. 5 is a flowchart showing a reduced-size printing process which is executed in the print system.

The reduced-size printing function will now be described with reference to FIG. 5. FIG. 5 is a flowchart showing a printing process using the reduced-size printing function which is executed by the print system 103. The CPU of the print system 103 executes each processing step in FIG. 5 on the basis of a control program. When the print system 103 receives user data from the host computer (not shown) of the user or an application program used by the user, the print system 103 starts the process in FIG. 5.

First, the print system 103 receives the user data (step S501) and obtains the necessary advertisement data 101 from the advertisement database (step S502).

Subsequently, whether the user data formed by the application or the like is enclosed in the predetermined user print area or not is discriminated (step S503).

If the user data is not enclosed in the predetermined user print area (YES in step S503), the user data is reduced without changing an aspect ratio so as to be adapted to the user print area (step S504). For example, the size of image shown by the user data is compared with a size of user print area, a reduction ratio is calculated, and the user data is reduced on the basis of the calculated reduction ratio. The reduction ratio can be also calculated by comparing a paper size designated by the user data with the size of user print area.

After that, the user data and the advertisement data are merged and print data is formed (step S505) and a print is performed on the basis of the formed print data (step S506). Processes which are executed in steps S505 and S506 are similar to the processes which are executed in steps S303 and S304.

Thus, even if the user data is large and a location to insert an advertisement cannot be inherently assured, the advertisement is certainly printed. A situation such that since the advertisement is printed, the image based on the user data is partially extinguished is prevented. The advertisement can be printed by using general paper.

In the above example, the user print area and the advertisement print area are fixed and have been preset by the print system 103. For example, the print system 103 stores coordinates data indicative of the user print area and coordinates data indicative of the advertisement print area. The print system 103 can set the coordinates data on the basis of coordinates data transmitted from an external apparatus or can set the coordinates data on the basis of coordinates data inputted from an annexed input apparatus. Thus, the advertiser can form advertisement data in accordance with the advertisement print area.

However, to print a more attractive advertisement or print matter which satisfies the user, it is also possible to construct the system in a manner such that the user can freely select or set a layout of the user print area and the advertisement print area.

Figure 6:
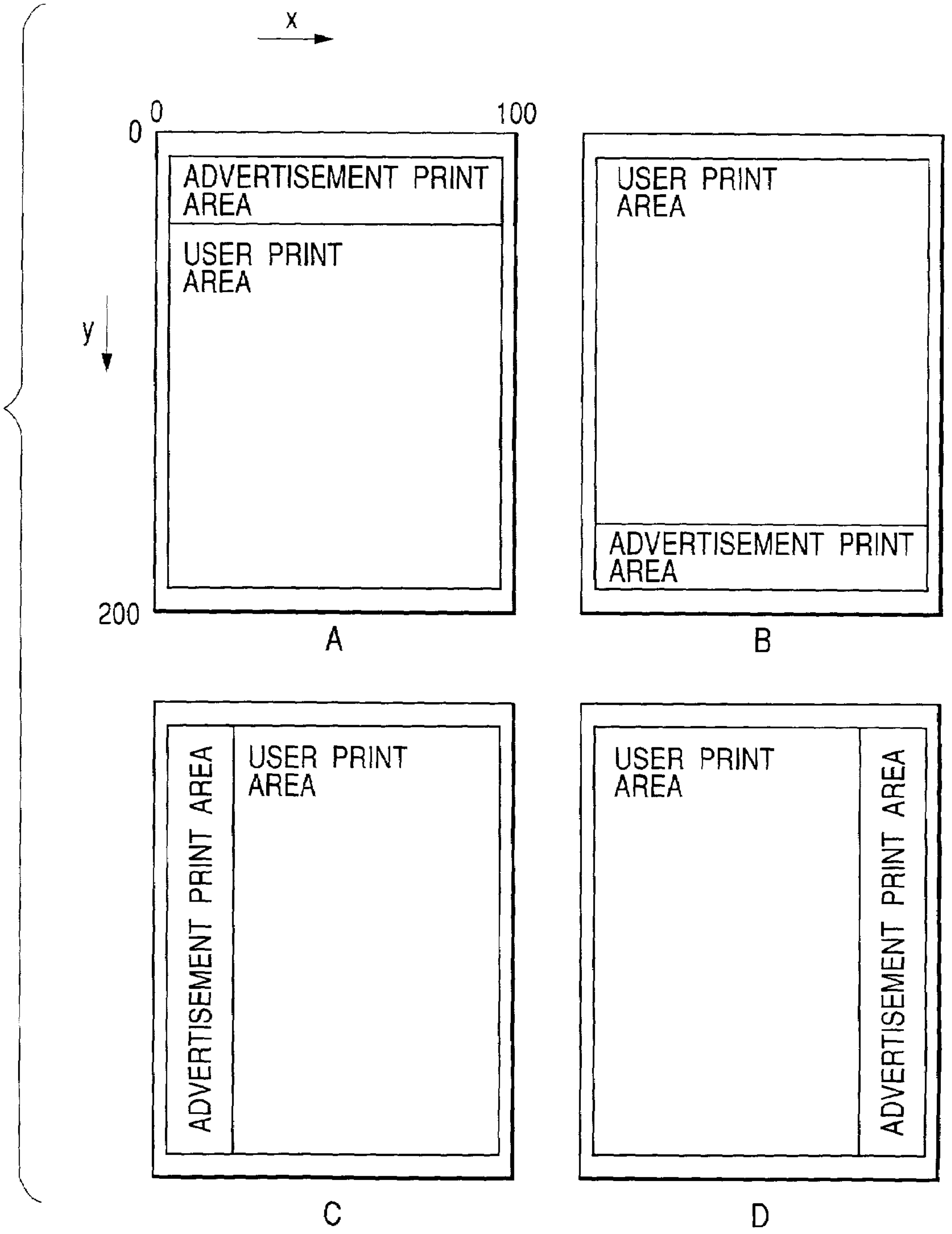
FIG. 6 is a diagram showing layout patterns of user print areas and advertisement print areas.

FIG. 6 is a diagram showing layout patterns of the user print area and the advertisement print area on a recording medium. In FIG. 6, four kinds of patterns (A, B, C, and D) are shown. FIG. 7 is a diagram showing an example of a table in which the coordinates data of each pattern has been stored. The print system 103 forms the print data with reference to the coordinates data stored in this table so that the user data is printed in the user print area and the advertisement data is printed in the advertisement print area, respectively.

Figure 8:
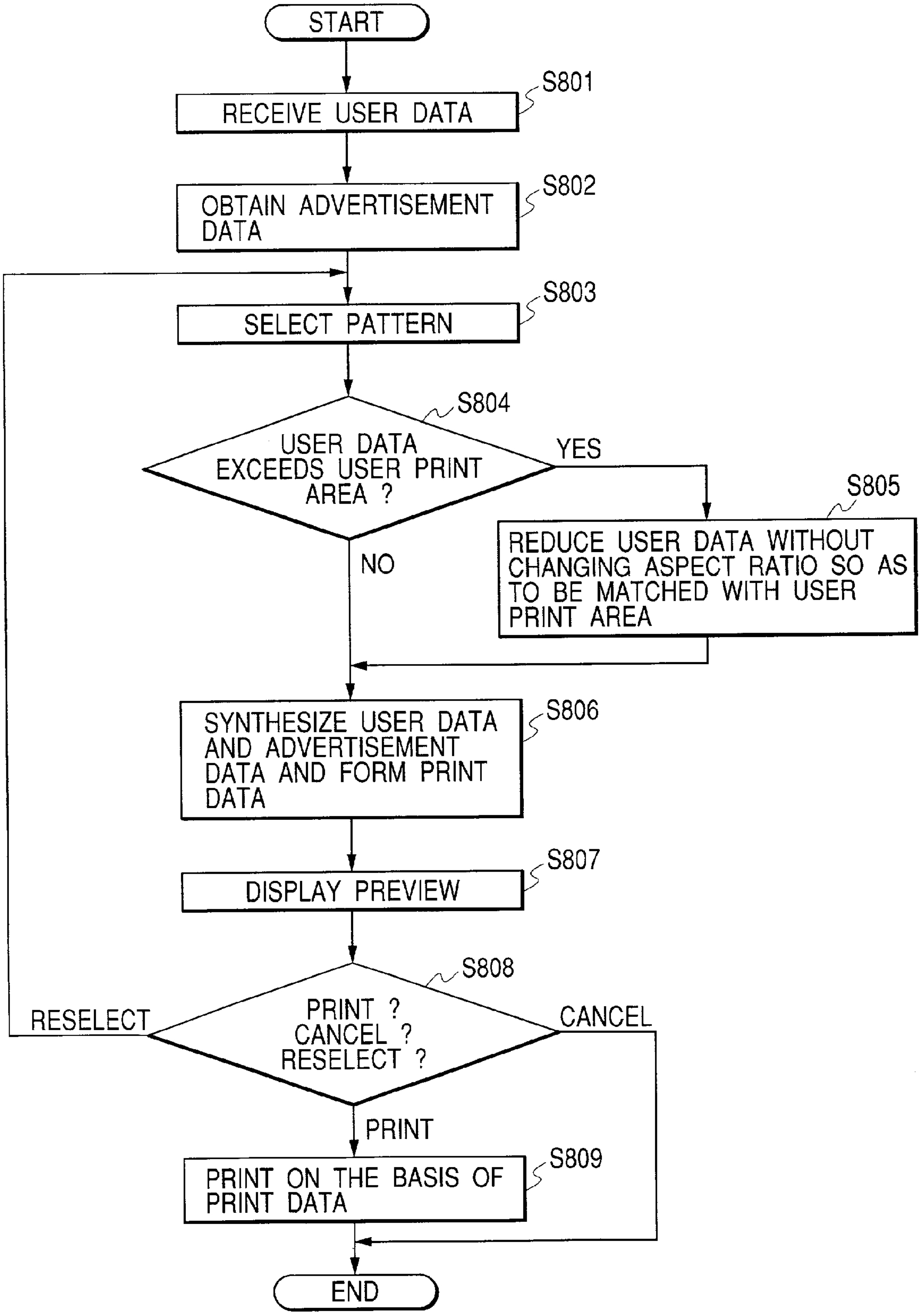
FIG. 8 is a flowchart showing a printing process which is executed in the print system.

FIG. 8 is a flowchart showing a printing process which is executed by the print system 103. The CPU of the print system 103 executes each processing step in FIG. 8 on the basis of a control program. When the print system 103 receives user data from the host computer (not shown) of the user or an application program used by the user, the print system 103 starts the process in FIG. 8.

First, the print system 103 receives the user data (step S801) and obtains the necessary advertisement data 101 from the advertisement database (step S802).

Subsequently, a pattern is selected (step S803). For example, the pattern designated by the print data can be selected or a picture plane to select the pattern can be also displayed to the host computer of the user or the print system 103. In the latter case, the user selects the pattern in the displayed picture plane. By allowing the user to select one of a predetermined number of patterns, it possible to prevent a situation such that the advertisement area is reduced as small as possible and most of the advertisement is not printed.

Subsequently, whether the user data formed by an application or the like is enclosed in the user print area of the pattern selected by the user or not is discriminated (step S804). At this time, the coordinates data of the user print area corresponding to the pattern selected by the user is read out from the table of FIG. 7, and the size shown by the coordinates data is compared with the size of image based on the user data.

If the user data is not enclosed in the predetermined user print area (YES in step S804), the user data is reduced without changing an aspect ratio so as to be adapted to the user print area (step S805). In step S806, the user data and the advertisement data are merged and the print data is formed.

After that, a preview of the image based on the formed print data is displayed to the user (step S806). If the preview is displayed to the host computer of the user, the print system 103 transmits the image data showing the image based on the print data to the host computer.

The user determines whether the print is permitted or cancelled or the pattern is reselected with reference to the preview screen. The print system 103 discriminates whether the print has been permitted or cancelled or the pattern has been reselected by the user (step S808). If the reselection of the pattern is selected, the processing routine is returned to step S803. If the cancellation of the print is selected, the processing routine is finished. If the print is permitted, step S809 follows.

In step S809, the print is performed on the basis of the formed print data.

Processes which are executed in steps S806 and S809 are similar to the processes which are executed in steps S303 and S304.

By executing the above processes, to print a more attractive advertisement or print matter which satisfies the user, the user can freely select or set a layout of the user print area and the advertisement print area.

The invention is not limited to a mode where the user data and the advertisement data are printed onto the same recording medium as shown in FIG. 1, but incorporates another mode in which the advertisement data is printed onto a recording medium different from the recording medium on which the user data has been printed: for example, in case of a print system in which the recording medium for recording the user data and the dedicated recording medium for the advertisement are purposely made different, in the case where the user does not want the print area matching (reduced-size printing) function as shown in FIG. 3 in a situation such that the user data to be printed exceeds the user print area on the recording medium and the user attaches importance to "WYSWYG" (What You See is What You Get), or in the case where the user wants to print the advertisement data onto another paper.

Anyway, it is an important point of the print system according to the invention that the user data and the advertisement data are printed in response to one print request.

Although the advertisement print area has been arranged in the footer portion of the recording medium in the above description, the advertisement print areas can be also arranged in the header portion, right and left blank portions, or the like. It is convenient to arrange them at positions where the advertisement seems to be more effective.

Figure 9:
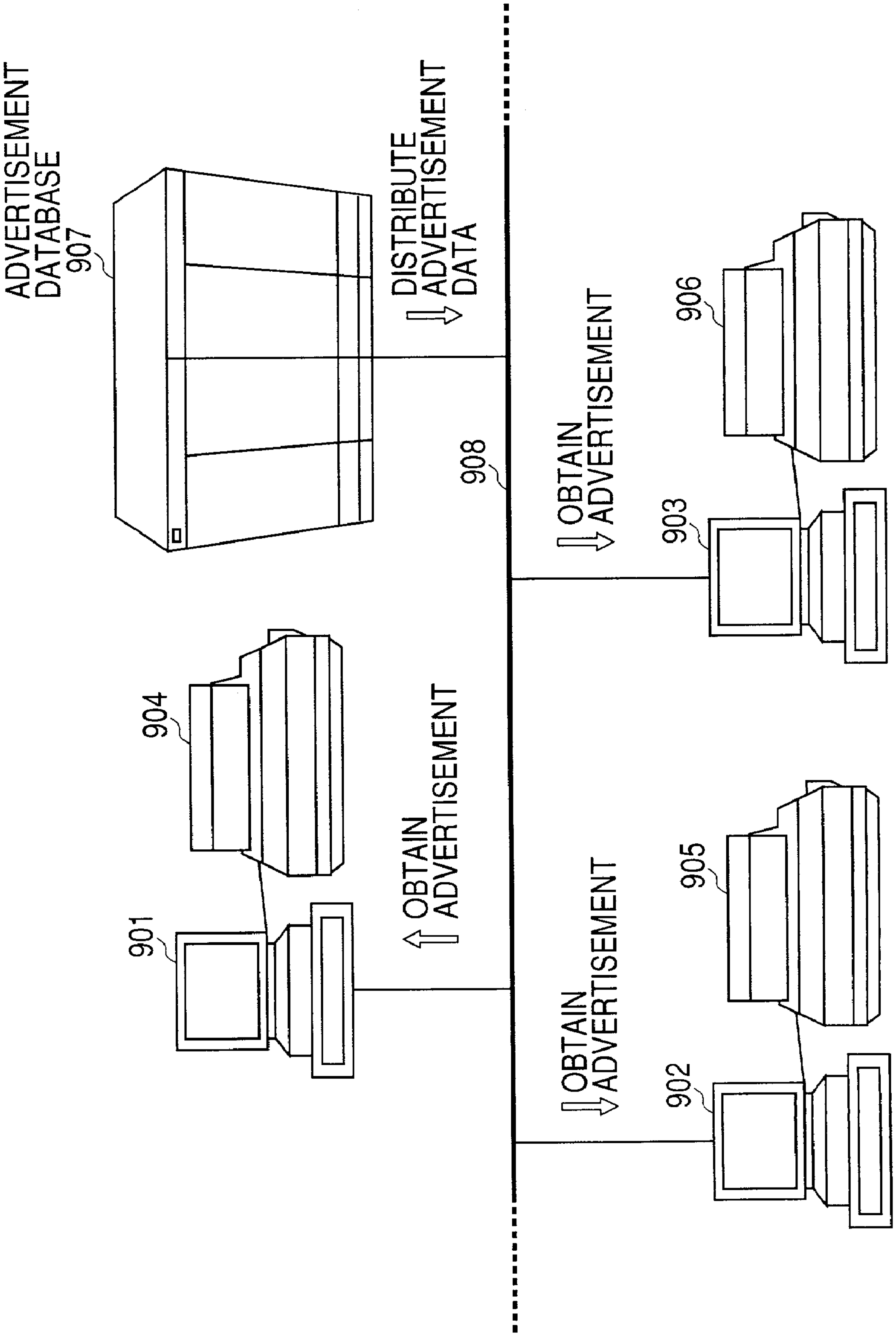
FIG. 9 is a whole constructional diagram showing the whole construction of the print system.

Subsequently, the advertisement database will be described. FIG. 9 is a whole constructional diagram showing the whole construction of the print system including the advertisement database.

In FIG. 9, print systems are constructed by a combination of a print server 901 and an image forming apparatus 904, a combination of a print server 902 and an image forming apparatus 905, and a combination of a print server 903 and an image forming apparatus 906, respectively. Those component elements and a WWW server 907 having the advertisement database are connected so that they can communicate via a network.

In the print system according to the invention, naturally, the number of print servers, image forming apparatuses, and WWW servers is not limited to that as shown in FIG. 9, but can be set to an arbitrary number.

Figure 10:
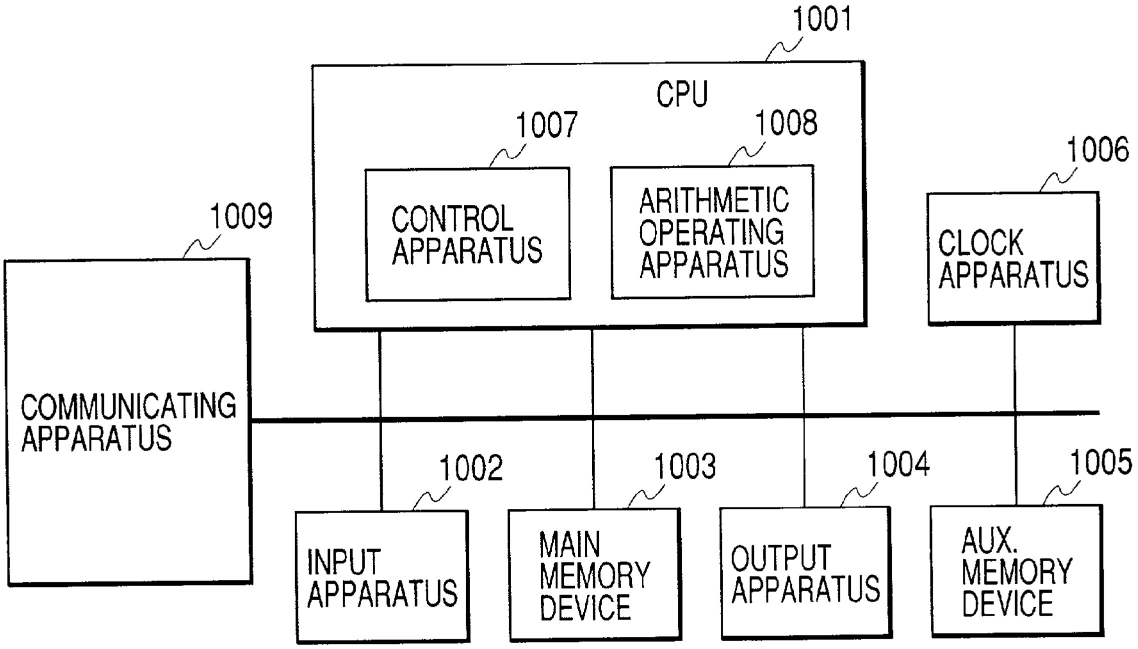
FIG. 10 is an internal block diagram of a WWW server.

Internal structures of the WWW server, print server, and print system which are used in the embodiment will now be described with reference to FIG. 10. FIG. 10 is an internal block diagram of each of the WWW server shown in FIG. 9, the print server shown in FIG. 9, and the print system shown in FIG. 1.

As shown in FIG. 10, each of the WWW server shown in FIG. 9, the print server shown in FIG. 9, and the print system shown in FIG. 1 comprises: a CPU (Central Processing Unit) 1001; an input apparatus 1002; a main memory device 1003; an output apparatus 1004; an auxiliary memory device 1005; a clock apparatus 1006; and a communicating apparatus 1009.

The CPU 1001 is a device called a processing unit as another name and comprises: a control apparatus 1007 for sending a command to each apparatus in the system and controlling the operation thereof; and an arithmetic operating apparatus 1008 for executing an arithmetic operating process of digital data.

The CPU 1001 realizes various functions in cooperation with programs stored in the main memory device 1003 and auxiliary memory device 1005.

The control apparatus 1007 reads data inputted from the input apparatus 1002 and a procedure (for example, program or software) which has previously been supplied, stores them into the main memory device 1003 in accordance with timing of clocks which are generated by the clock apparatus 1006, sends commands to the arithmetic operating apparatus 1008 on the basis the read contents, and allows it to execute the arithmetic operating process. A result of the arithmetic operating process is transmitted to an internal apparatus such as main memory device 1003, output apparatus 1004, or auxiliary memory device 1005, an external apparatus, or the like on the basis of the control of the control apparatus 1007.

The input apparatus 1002 is a member for inputting various data. For example, there are a keyboard, a mouse, a pointing device, a touch panel, a mouse pad, a CCD camera, a card reader, a paper tape reader, a magnetic tape apparatus, and the like.

The main memory device 1003 is a member called a memory and is a member for indicating all memory spaces which can be addressed and are used for executing the command in the processing apparatus and internal memory device. The main memory device 1003 is constructed mainly by a semiconductor memory device, stores or holds the inputted program or data, reads out the stored or held data, and stores it into, for example, a register in accordance with an instruction from the control apparatus 1007.

As a semiconductor memory device constructing the main memory device 1003, an RAM (Random Access Memory), an ROM (Read Only Memory), or the like can be used.

The output apparatus 1004 is a member for outputting the result of the arithmetic operating process or the like of the arithmetic operating apparatus 1008. For example, a display such as CRT, plasma display panel, liquid crystal display, or the like, a printing apparatus such as a printer or the like, an audio output apparatus, or the like corresponds to the output apparatus 1004.

The auxiliary memory device 1005 is a member for supplementing a memory capacity of the main memory device 1003. For example, a floppy disk, a hard disk, a CD-ROM, a CD-R, a CD-RW, an MO, or the like using a magnetic disk apparatus, an optical disk apparatus, a semiconductor disk apparatus, or the like corresponds to the auxiliary memory device 1005.

The communicating apparatus 1009 is an apparatus for making communication via the network and properly executing transmission and reception of data, digital/analog conversion, or the like in accordance with the network to which this apparatus is connected.

Those apparatuses are mutually connected by an address bus or a data bus.

The number of main memory devices 1003 and the number of auxiliary memory devices 1005 is not limited to one but can be set to an arbitrary number. If the number of main memory devices 1003 and the number of auxiliary memory devices 1005 increase, anti-fault performance of the server is further improved.

The program according to the invention is stored (recorded) into at least one of the main memory device 1003 and the auxiliary memory device 1005.

Therefore, at least one of the main memory device 1003 and the auxiliary memory device 1005 corresponds to the computer-readable recording medium in which the program according to the invention has been recorded. Besides, a CD-ROM, an FD, a CD-R, CD-RW, or the like can be also used as a computer-readable recording medium in which the program according to the invention has been recorded.

The computer-readable recording medium in the description of the invention and the embodiment incorporates a server-readable recording medium or a client-readable recording medium.

The program which is applied to the system in the invention corresponds to one of each program which is applied to each of the computer, server, and apparatus constructing the system, a combination of those programs which are applied to them, and the whole program which is applied to each of them.

That is, as a computer-readable recording medium in which the program according to the invention has been recorded, even in the case where the program for realizing the processes of the system comprises a plurality of steps, a recording medium in which all of the steps have been recorded can be also provided for one apparatus, or by allowing an arbitrary apparatus constructing the system to have a recording medium in which an arbitrary part of the plurality of steps have been recorded, the recording medium in which an arbitrary part of the plurality of steps have been recorded is provided for the arbitrary apparatus, thereby constructing the program for realizing the processes of the system as a whole.

The auxiliary memory device 1005 shown in FIG. 10 stores a database comprising various information.

Not only the auxiliary memory device 1005 is used as a database but also a database server connected to the present server can be used.

However, as a division of the database, a conceptual division of information is important and the invention is not concerned with a physical division of the recording medium. Therefore, in case of a plurality of databases, for example, there is a case of a set of (conceptually) a plurality of information stored in one magnetic disk or optical disk. In case of one database, there is a case of a set of (conceptually) one information stored in a plurality of magnetic disks or optical disks.

In the above description, only an internal construction of the WWW server 907 shown in FIG. 9 has been explained. However, an internal construction of each of the print servers 901, 902, and 903 shown in FIG. 9 is also similar to that shown in FIG. 10.

As shown in FIG. 9, the advertisement data is periodically distributed to the print server via a communication line.

Figure 11:
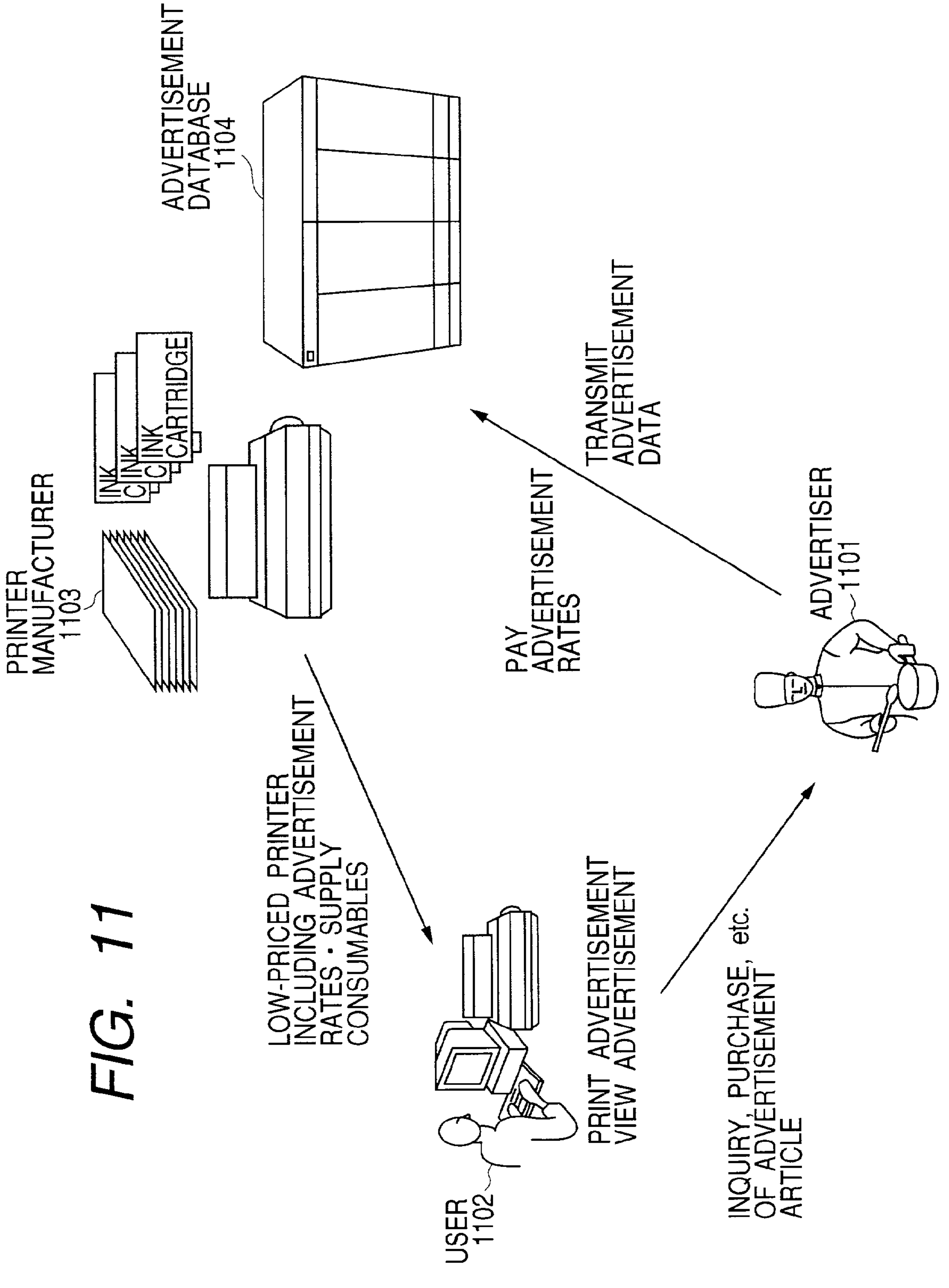
FIG. 11 is a conceptual diagram of an advertising method.

FIG. 11 is a conceptual diagram of a specific advertising method using the print system shown in FIG. 1.

An advertiser 1101 pays predetermined advertisement rates to a printer manufacturer 1103 which manages the advertisement database as compensation in case of putting advertisement data into the advertisement database.

The printer manufacturer 1103 subtracts the advertisement rates from the price of the printer or consumables and releases the printer or consumables to the market.

A user 1102 obtains the low-priced printer or consumables and can print at a low running cost.

As a price for the low running cost, when the user prints the user data, an advertisement is printed. By printing the advertisement onto the recording medium as mentioned above, an advertising effect can be expected more than that in case of the volatile advertisement using the Internet.

Although the advertisement data has been periodically transferred from the advertisement database to the print server in the above example, the advertisement data suitable for the user can be also transferred from the advertisement database to the print server in accordance with the user who intends to print.

Figure 12:
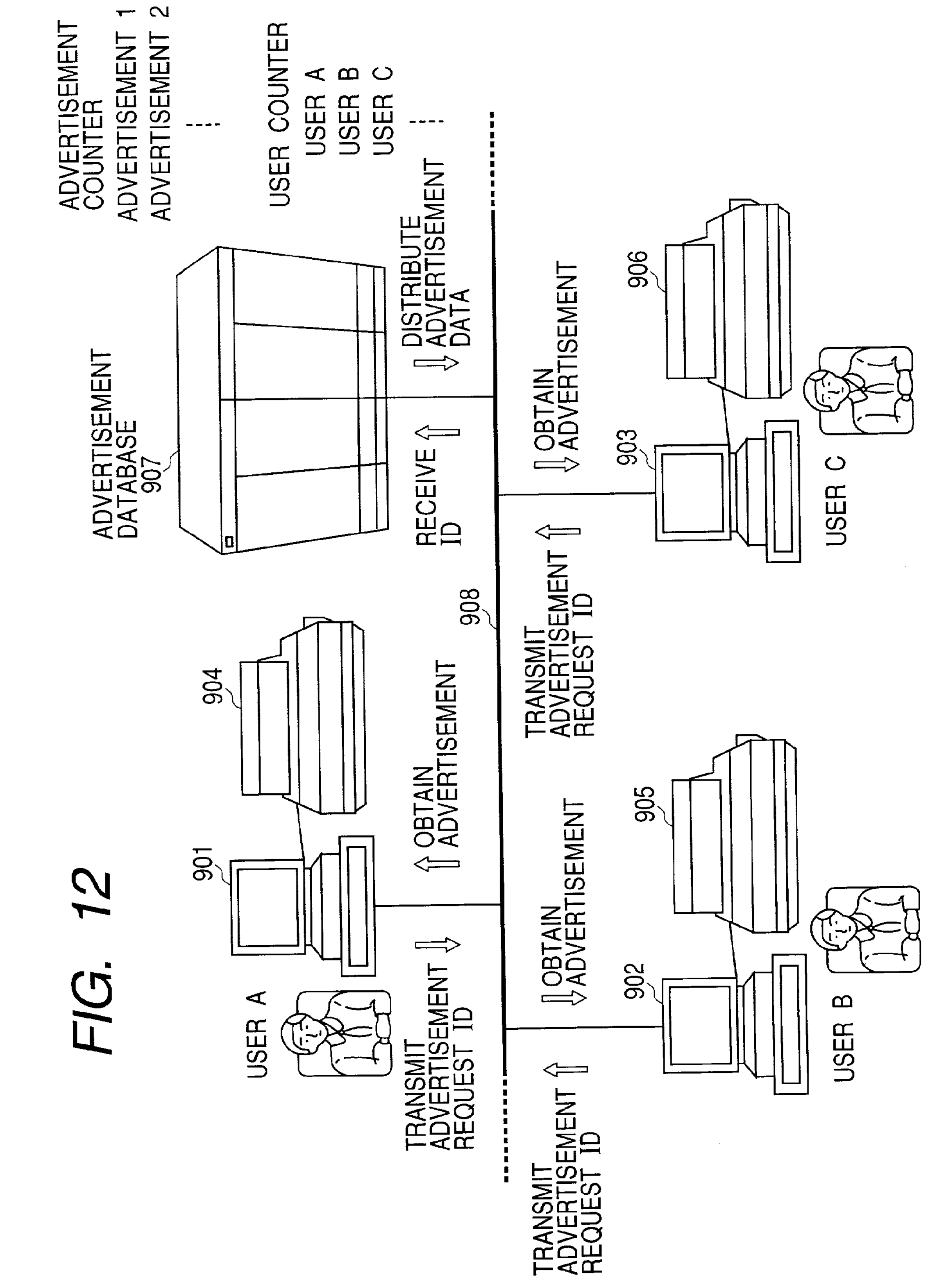
FIG. 12 is a whole constructional diagram showing the whole construction of the print system.

FIG. 12 is a whole constructional diagram showing the whole construction of the print system including the advertisement database. In FIG. 12, print systems are constructed by a combination of the print server 901 and image forming apparatus 904, a combination of the print server 902 and image forming apparatus 905, and a combination of the print server 903 and image forming apparatus 906, respectively. Those component elements and the WWW server 907 having the advertisement database are further connected so that they can communicate via a network.

A large difference from the print system of FIG. 9 is that each time the user prints the user data, he requests the advertisement data from the advertisement database via a communicating circuit 908. At this time, the print system simultaneously transmits a user ID which has been registered upon purchase or the like of the printer to the database.

The advertisement database receives an advertising request and the user ID from the print system and transmits the advertisement data according to the user ID from the user ID to the print system.

A counter for storing the number of advertisements every advertisement data to be transmitted (such a counter is called an advertisement counter hereinbelow) and a counter for storing the number of advertisements transmitted every user (such a counter is called a user counter hereinbelow) are provided for the advertisement database.

Those counters will now be explained with reference to FIGS. 13A and 13B. FIGS. 13A and 13B are conceptual diagrams of the counters which are stored in the WWW server 907 shown in FIG. 12. FIG. 13A shows the advertisement counter. FIG. 13B shows the user counter.

The advertisement counter shows the total number of times at which the advertisement data has been transmitted every advertisement data. The manufacturer calculates the advertisement rates of each advertisement data in accordance with a count value of the counter and charges the advertisement rates from the advertiser.

The user counter shows the number of advertisement data printed by each user. That is the number of times at which each user has printed each advertisement data. When the value of the counter is accumulated until a predetermined value, for example, the right of exchanging the count value of the counter with the printer/consumables is provided for the user, and the consumables are sent from the manufacturer to the user in place of the count value of the counter.

Figure 14:
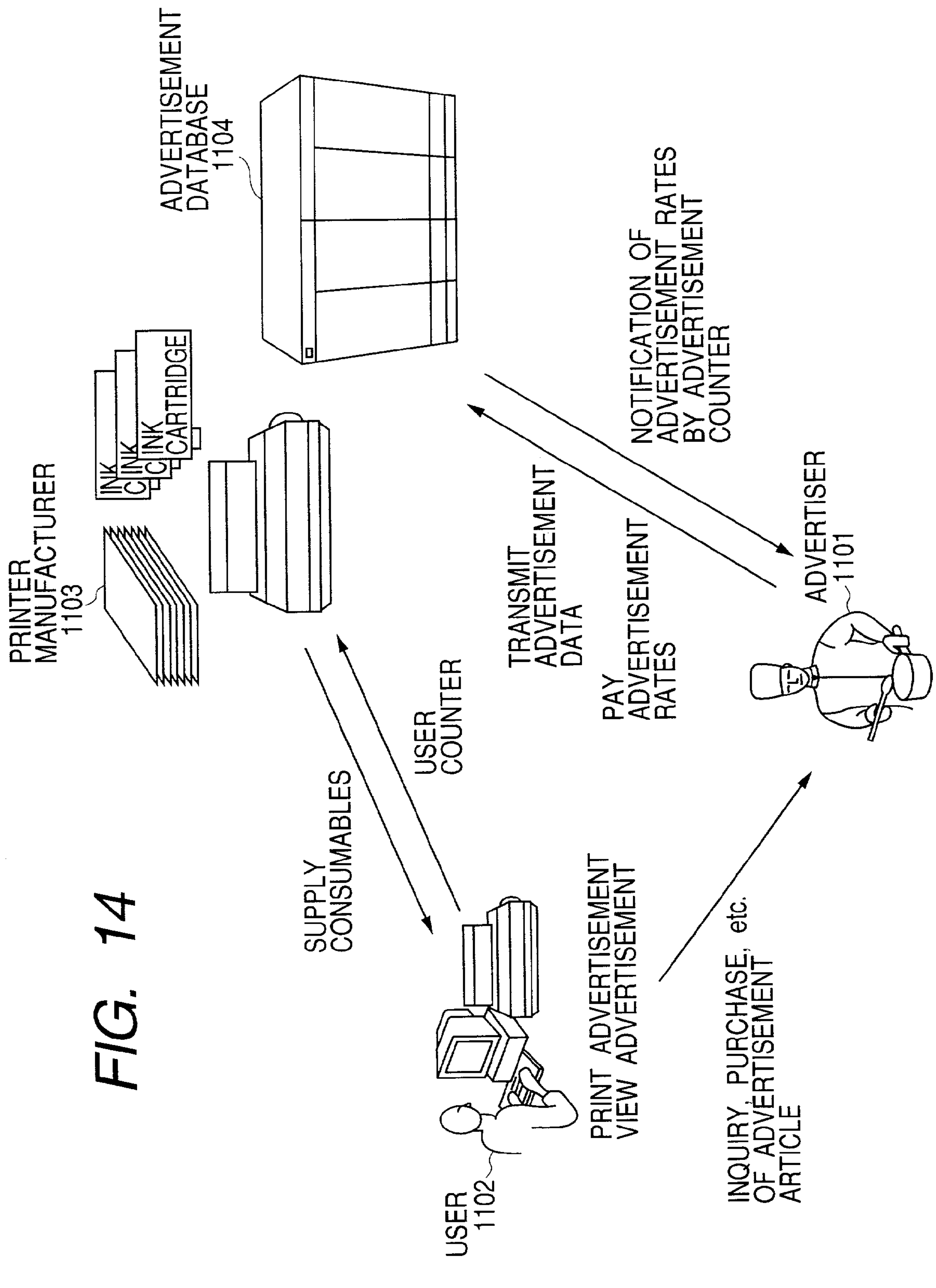
FIG. 14 is a conceptual diagram of an advertising method.

Such an advertising method will be explained with reference to FIG. 14. FIG. 14 is a conceptual diagram of an advertising method which is executed in the print system of FIG. 12.

For example, assuming that the printer is an ink jet printer and the count value of the user counter has reached 500 points, a set of ink cartridges, 500 sheets of recording paper, 100 sheets of high-class paper, or the like are sent to the user 1102 from the printer manufacturer 1103 of the ink jet printer for free in accordance with a desire of the user.

The advertiser 1101 pays the advertisement rates to the printer manufacturer 1103 which manages the advertisement database on the basis of the count value of the advertisement counter.

As mentioned above, it is sufficient that the advertiser pays the advertisement rates to the manufacturer by an amount charged for the number of printed advertisements, and the user can advantageously obtain the consumables of the printer in accordance the number of printed advertisements, so that it is very useful.

Since the consumables of the printer can be advantageously obtained, the number of prints also actively increases, so that the manufacturer can manufacture a large quantity of consumables and all of the user, advertiser, and manufacturer can construct the advantageous advertising method.

The advertisement system described above relates to almost one-sided and unitary distribution of the advertisements to the user.

The invention is not limited to it but, for example, in order to reflect information which the user inherently wants to obtain to the advertisement, for example, when the user purchases the printer and registers it, or by periodically executing a questionnaire survey or the like and distributing the advertisement arranged every user on the basis of results of the survey, the information is supplemented, thereby enabling a more effective advertisement to be performed.

Figure 15:
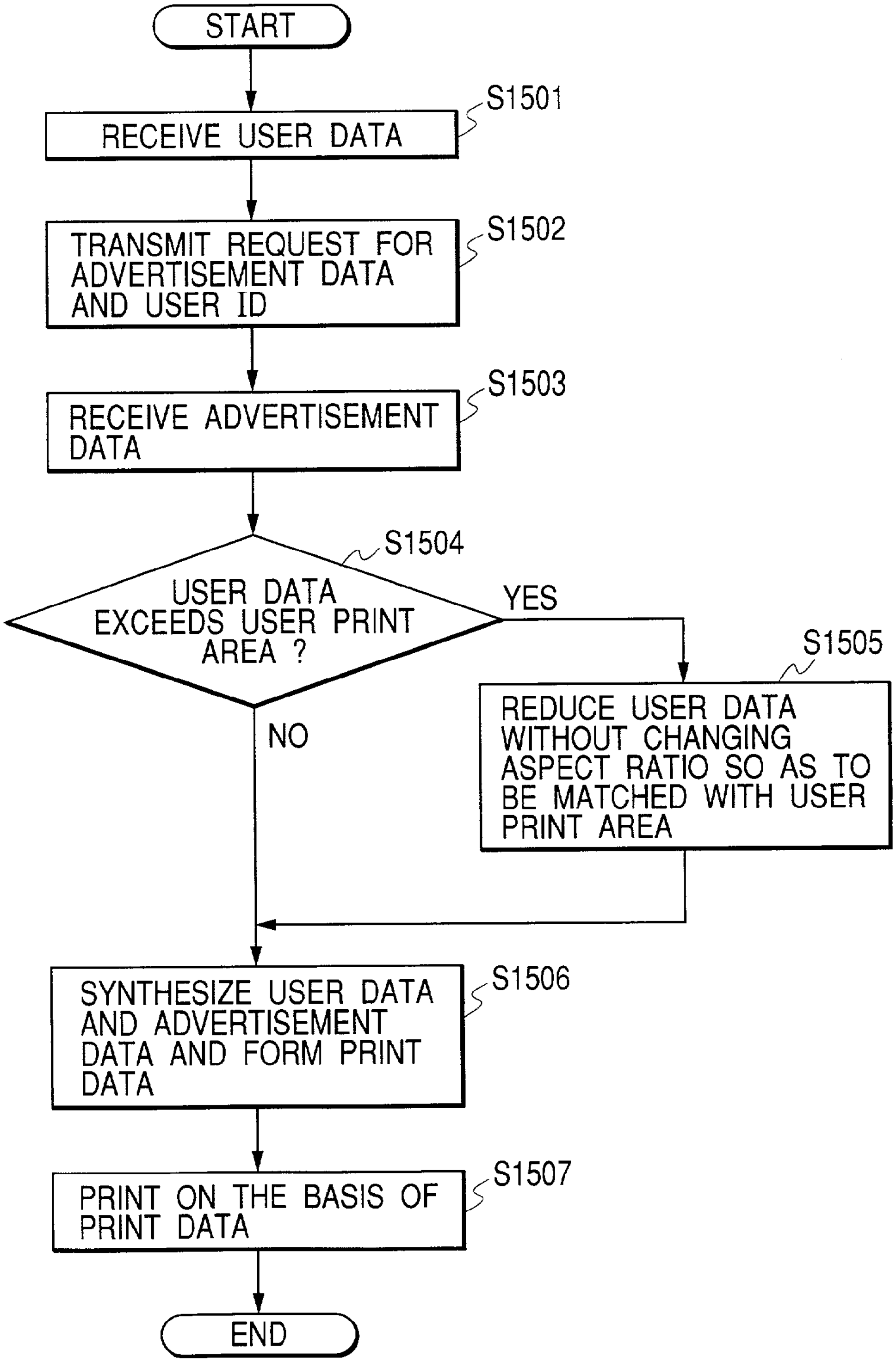
FIG. 15 is a flowchart showing a printing process which is executed in the print system.

FIG. 15 is a flowchart showing the printing process which is executed by the print system in FIG. 12. Processing steps in FIG. 15 are executed by the CPU of the print server in FIG. 12 on the basis of a control program. When the print system in FIG. 12 receives the user data from the host computer (not shown) of the user or an application program used by the user, the CPU starts the processes in FIG. 15.

First, the print system receives user data (step S1501). The print system extracts the user ID of the user serving as a transmitting source of the user data from the user data, transmits the extracted user ID to the WWW server 907, and requests the advertisement data from the WWW server 907 (step S1502). To print the more suitable advertisement, taste information showing a taste of the user is transmitted to the WWW server 907. The advertisement data which is transmitted by the WWW server 907 is received (step S1503).

Subsequently, whether the user data formed by the application or the like is enclosed in a predetermined user print area or not is discriminated (step S1504).

If the user data is not enclosed in the predetermined user print area (YES in step S1504), the user data is reduced without changing an aspect ratio so as to be adapted to the user print area (step S1505). For example, a size of image shown by the user data is compared with a size of user print area, a reduction ratio is calculated, and the user data is reduced on the basis of the calculated reduction ratio, or a reduction ratio can be also calculated by comparing the paper size designated by the user data with the size of user print area.

After that, the user data and the advertisement data are merged and print data is formed (step S1506) and a print is performed on the basis of the formed print data (step S1507). Processes which are executed in steps S1506 and S1507 are similar to the processes which are executed in steps S303 and S304.

Figure 16:
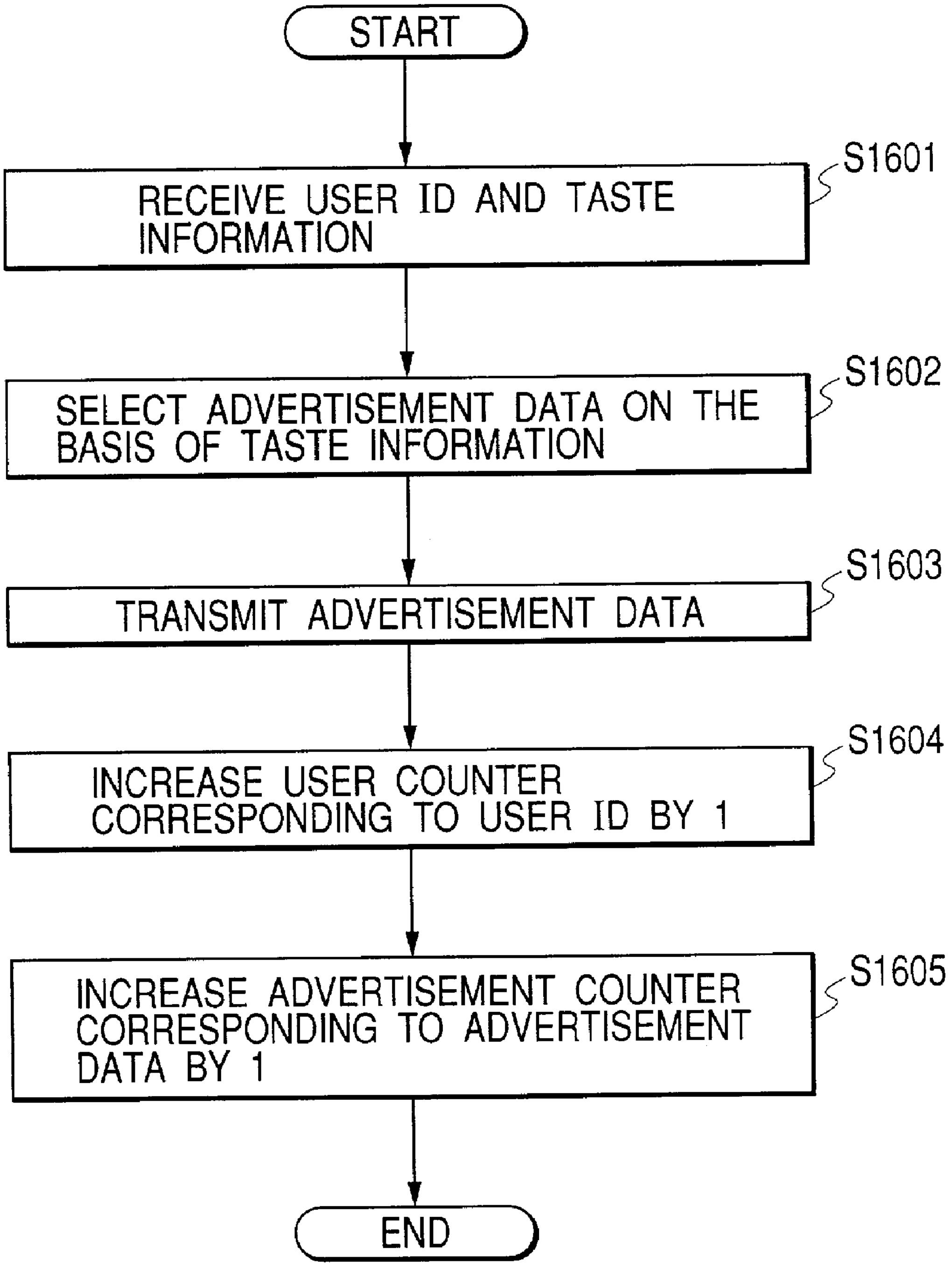
FIG. 16 is a flowchart showing a transmitting process of advertisement data.

FIG. 16 is a flowchart showing an advertisement data transmitting process which is executed by the WWW server 907. The CPU of the WWW server 907 executes processing steps in FIG. 16 on the basis of a control program. When the print system requests the advertisement data from the WWW server 907, the processes in FIG. 16 are started.

First, the user ID and the taste information are received (step S1601). Subsequently, on the basis of the taste information, the advertisement data adapted to the user is sequentially selected from the database and obtained (step S1602). The obtained advertisement data is returned to the print system (step S1603).

Further, the count value of the user counter corresponding to the user ID is increased by "1" (step S1604) and the count value of the advertisement counter corresponding to the obtained advertisement data is increased by "1" (step S1605).

By this method, the advertisement suitable for the user who tries to print is printed into the advertisement print area.

The programs to realize the invention and the data associated thereto are stored in a floppy disk (FD) or a CD-ROM, from which they are supplied to the computer.

The objects of the invention are accomplished by a method whereby a memory medium in which program codes of software (control program) to realize the functions of the embodiments mentioned above have been recorded is supplied to a computer, a CPU of the computer reads out the program codes stored in the memory medium and executes processes according to the read-out program codes. As a method of supplying the program and data to the computer, there is generally a method whereby they are stored into a floppy disk FD and supplied therefrom into a computer main body (via a floppy disk drive). In this case, the program codes themselves read out from the memory medium realize the functions of the embodiments mentioned above, and the memory medium in which the program codes have been stored constructs the invention.

As a memory medium for supplying the program codes, for example, besides the floppy disk and hard disk, it is also possible to use an optical disk, a magnetooptic disk, a CD-ROM, a CD-R, a magnetic tape, a non-volatile memory card, an ROM, or the like. Naturally, the invention incorporates not only a case where the functions of the embodiments mentioned above are realized by executing the read-out program codes by a computer, but also a case where on the basis of instructions of the program codes, an OS (Operating System) or the like which is operating on the computer executes a part or all of actual processes, and the functions of the embodiments mentioned above are realized by those processes. Further, naturally, the invention also incorporates a case where the program codes read out from a memory medium are written into a memory equipped for a function expanding board inserted into a computer or a function expanding unit connected to a computer and, thereafter, on the basis of instructions of the program codes, a CPU or the like equipped for the function expanding board or the function expanding unit executes a part or all of actual processes, and the functions of the embodiments mentioned above are realized by those processes.

As described above, according to the invention, since an advertisement is certainly printed, an advertising effect is efficiently exercised.

Since an advertisement is certainly printed, a burden on the user is reduced with respect to the cost of the use of the image forming apparatus and the cost of the consumables of the image forming apparatus.

The demerit of the small advertising effect due to the volatile performance of the Internet advertisement and the demerit of the dull consumption due to high prices of the printer and the consumables of the printer can be very effectively compensated.

Since the advertisement is printed onto a non-volatile material object, the advertiser can perform the very effective advertisement and publicity. Since the manufacturer of the image forming apparatus which provides printers and consumables can expect a profit of advertisement rates from the advertiser, by inserting it into manufacturing and circulating costs of a product, a retail unit price of the image forming apparatus can be reduced.

The user can cheaply obtain the image forming apparatus and the consumables, the burden on the user is reduced, and a large quantity of sheets can be printed without constraint.

It is possible to provide a novel and epoch-making system which is very useful to three parties of the user, advertiser, and manufacturer of the image forming apparatus.

What is claimed is:

1. A print system comprising:

a print server adapted to set a user print area and an advertisement print area on the basis of data indicative of the user print area and the advertisement print area on a recording medium, wherein the data is indicative of coordinate information of the user print area and coordinate information of the advertisement print area, wherein the coordinate information of the user print area corresponds to a pattern selected by a user and a size of the user print area and adapted to synthesize print data of the user and advertisement data based on the set data of the user print area and the advertisement print area in a manner such that an image based on the print data of the user is printed into the user print area on the recording medium and an image based on the advertisement data is printed into advertisement print area on the recording medium; and an image forming apparatus adapted to form the image based on the print data of the user into the user print area on the recording medium and adapted to form the image based on the advertisement data into the advertisement print area on the recording medium.

2. A system according to claim 1, wherein the data indicative of the user print area and the advertisement print area is transmitted from an external apparatus or input from an input apparatus.

3. A print control apparatus for printing on the basis of print data of the user, comprising:

a setting unit adapted to set a user print area and an advertisement print area on the basis of data indicative of the user print area and the advertisement print area on a recording medium, wherein the data is indicative of coordinate information of the user print area and coordinate information of the advertisement print area wherein the coordinate information of the user print area corresponds to a pattern selected by a user and a size of the user print area;

a synthesizing unit adapted to synthesize the print data of the user and advertisement data based on the set data of the user print area and the advertisement print area in a manner such that an image based on the print data of the user is printed into the user print area on the recording medium and an image based on the advertisement data is printed into the advertisement print area on the recording medium, thereby forming image data; and a print controlling unit adapted to control so as to form the image based on the print data of the user into the user print area on the recording medium and to form the image based on the advertisement data into the advertisement print area on the recording medium on the basis of the image data formed by said synthesizing unit.

4. An apparatus according to claim 3, wherein said synthesizing unit reduces the image based on the print data of the user without changing an aspect ratio of said image so as to be adapted to the user print area.

5. An apparatus according to claim 3, further comprising a receiving unit adapted to receive the print data of the user from an external apparatus via a network, and wherein said synthesizing unit forms the image data on the basis of the print data received by said receiving unit and the advertisement data.

6. An apparatus according to claim 3, further comprising a storing unit adapted to store data which defines the user print area and data which defines the advertisement print area, and wherein said synthesizing unit forms the image data in a manner such that the image based on the print data of the user and the image based on the advertisement data are printed into the user print area and the advertisement print area determined by the data stored in said storing unit.

7. An apparatus according to claim 3, wherein the data indicative of the user print area and the advertisement print area is transmitted from an external apparatus or input from an input apparatus.

8. A printing method of printing on the basis of print data of the user and advertisement data, comprising the steps of:

setting a user print area and an advertisement print area on the basis of data indicative of the user print area and the advertisement print area on a recording medium, wherein the data is indicative of coordinate information of the user print area and coordinate information of the advertisement print area wherein the coordinate information of the user print area corresponds to a pattern selected by a user and a size of the user print area;

synthesizing the print data of the user and the advertisement data based on the set data of the user print area and the advertisement print area in a manner such that an image based on the print data of the user is printed into the user print area on the recording medium and an image based on the advertisement data is printed into the advertisement print area on the recording medium, thereby forming image data; and forming the image based on the print data of the user into the user print area on the recording medium and forming the image based on the advertisement data into the advertisement print area on the recording medium on the basis of said formed image data.

9. A method according to claim 8, wherein the image based on the print data of the user is reduced without changing an aspect ratio of said image so as to be adapted to the user print area.

10. A method according to claim 8, wherein the print data of the user is received from an external apparatus via a network, and the image data is formed on the basis of the received print data and the advertisement data.

11. A method according to claim 8, wherein data which defines the user print area and data which defines the advertisement print area are stored, and the image data is formed in a manner such that the image based on the print data of the user and the image based on the advertisement data are printed into the user print area and the advertisement print area determined by the stored data.

12. A method according to claim 8, wherein the advertisement data which is distributed is determined on the basis of a user ID for identifying the user.

13. A method according to claim 8, wherein the data indicative of the user print area and the advertisement print area is transmitted from an external apparatus or input from an input apparatus.

14. A method according to claim 12, wherein the number of advertisement data distributed to the user is accumulated every user.

15. A method according to claim 14, wherein consumables of an image forming apparatus which can be exchanged are selected in accordance with the number of advertisement data distributed to the user.

16. A method according to claim 12, wherein the number of times of said distribution is accumulated every advertisement data.

17. A method according to claim 16, wherein advertisement rates are calculated on the basis of the number of times of said distribution.

18. A computer-executable code stored on a computer-readable recording medium for printing on the basis of print data of the user and advertisement data, wherein said computer-executable code allows a computer to execute the steps of:

setting a user print area and an advertisement print area on the basis of data indicative of the user print area and the advertisement print area on a recording medium, wherein the data is indicative of coordinate information of the user print area and coordinate information of the advertisement print area wherein the coordinate information of the user print area corresponds to a pattern selected by a user and a size of the user print area;

synthesizing the print data of the user and the advertisement data based on the set data of the user print area and the advertisement print area in a manner such that an image based on the print data of the user is printed into the user print area on the recording medium and an image based on the advertisement data is printed into the advertisement print area on the recording medium, thereby forming image data; and forming the image based on the print data of the user into the user print area on the recording medium and forming the image based on the advertisement data into the advertisement print area on the recording medium on the basis of said formed image data.

19. A computer-executable code stored on a computer-readable recording medium according to claim 18, wherein the data indicative of the user print area and the advertisement print area is transmitted from an external apparatus or input from an input apparatus.

* * * * *